United States Patent
Paek (10) Patent No.: US 7,792,211 B2
(45) Date of Patent: Sep. 7, 2010

(54) SYSTEM, MODEM, RECEIVER, TRANSMITTER AND METHOD FOR IMPROVING TRANSMISSION PERFORMANCE

(75) Inventor: Hoon Paek, Seongnam-si (KR)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 1067 days.

(21) Appl. No.: 11/117,401

(22) Filed: Apr. 29, 2005

(65) Prior Publication Data

US 2006/0023798 A1 Feb. 2, 2006

(30) Foreign Application Priority Data

Aug. 2, 2004 (KR) .................. 10-2004-0060905

(51) Int. Cl.
*H04L 27/00* (2006.01)
(52) U.S. Cl. .............. 375/295; 375/152; 375/260; 375/299; 375/267
(58) Field of Classification Search ............. 375/152, 375/260, 299, 267
See application file for complete search history.

(56) References Cited

U.S. PATENT DOCUMENTS

| 6,507,621 | B2 | 1/2003 | Matsumoto et al. |
| 6,693,984 | B1 | 2/2004 | Andre |
| 6,992,973 | B2 * | 1/2006 | Sakoda et al. ............ 370/208 |
| 7,248,645 | B2 | 7/2007 | Vialle et al. |
| 2001/0028632 | A1 * | 10/2001 | Horisaki et al. ............ 370/235 |
| 2002/0048333 | A1 | 4/2002 | Ahmed et al. |
| 2002/0154716 | A1 | 10/2002 | Erving et al. |
| 2002/0186756 | A1 * | 12/2002 | Kolze et al. ............ 375/152 |
| 2003/0040275 | A1 * | 2/2003 | Bridgelall ............ 455/41 |
| 2004/0042385 | A1 * | 3/2004 | Kim et al. ............ 370/203 |
| 2004/0105465 | A1 * | 6/2004 | Gross et al. ............ 370/480 |
| 2004/0120409 | A1 * | 6/2004 | Yasotharan et al. ......... 375/260 |
| 2004/0259556 | A1 * | 12/2004 | Czys ............ 455/447 |
| 2005/0002468 | A1 * | 1/2005 | Walton et al. ............ 375/267 |
| 2005/0036541 | A1 * | 2/2005 | McKown ............ 375/233 |
| 2005/0117660 | A1 * | 6/2005 | Vialle et al. ............ 375/299 |
| 2005/0141545 | A1 * | 6/2005 | Fein et al. ............ 370/445 |
| 2006/0121946 | A1 * | 6/2006 | Walton et al. ............ 455/561 |
| 2007/0147529 | A1 * | 6/2007 | Bocquet ............ 375/260 |
| 2008/0062888 | A1 * | 3/2008 | Lusky et al. ............ 370/252 |

FOREIGN PATENT DOCUMENTS

EP 1359684 A1 11/2003

OTHER PUBLICATIONS

Notice of First Office Action from the State Intellectual Property Office ("SIPO") of the People's Republic of China dated Oct. 16, 2009, for corresponding Chinese Patent Application No. 2005101099000, and English-language translation of the Notice of First Office Action.

\* cited by examiner

*Primary Examiner*—Shuwang Liu
*Assistant Examiner*—Kenneth Lam
(74) *Attorney, Agent, or Firm*—Harness, Dickey & Pierce, P.L.C.

(57) ABSTRACT

A system, modem, receiver, transmitter and method for improving transmission performance. A coefficient may be calculated using a received signal. A process may be performed on at least one data packet scheduled for transmission based on the calculated coefficient. The process may improve transmission performance.

22 Claims, 5 Drawing Sheets

SYSTEM, MODEM, RECEIVER, TRANSMITTER AND METHOD FOR IMPROVING TRANSMISSION PERFORMANCE

This application claims the priority of Korean Patent Application No. 10-2004-0060905, filed on Aug. 2, 2004, in the Korean Intellectual Property Office, the disclosure of which is incorporated herein in its entirety by reference.

BACKGROUND OF THE INVENTION

1. Field of the Invention

Example embodiments of the present invention are related generally to a system, modem, transmitter and method for improving transmission performance, and more particularly to a system, modem, transmitter and method for improving transmission performance by applying a time domain equalizing (TEQ) process.

2. Description of Related Art

In a coded orthogonal frequency division multiplexing (COFDM) system, portions of data may be encoded by frequency division multiplexing (FDM) based on a modulation/demodulation method. A plurality (e.g., hundreds) of carrier waves may be allocated to transmit the encoded portions of data. Instead of transmitting the encoded portions of data sequentially (e.g., not at the same time), the encoded portions of data may be simultaneously transmitted in the COFDM system. The simultaneous transmission may enable a wider symbol interval and/or may reduce an impulse noise effect (e.g., performance degradation due to impulse noise). The COFDM system may further decrease an inter-symbol interference (ISI).

An electromagnetic wave may be received through a plurality of propagation paths (e.g., due to reflections off of buildings in a city). An image signal (e.g., a video signal) carried on the electromagnetic wave may have a ghost effect (e.g., due to the differences in the received signal based on the different propagation paths) and an audio signal may include a higher level of noise (e.g., impulse noise).

The COFDM system may be implemented within a single frequency network (SFN). Transmission rates for carrier waves may be individually adjusted. The transmission rate adjustment may increase an overall transmission rate (e.g., as compared to a single carrier wave modulation scheme). The COFDM system may be used with digital signal processing (DSP) and very large scale integration (VLSI) technologies. For example, the COFDM system may be adapted to digital audio broadcast (DAB), terrestrial digital broadcast and/or a high definition television (HDTV) broadcast.

In conventional COFDM systems, data may be transmitted in units referred to as symbols. An impulse response may occur in the data transmission through an air (i.e., wireless) and/or a cable (i.e., wired) channel. Adjacent symbols may be affected by the impulse response. The impulse response may cause ISI. The ISI may delay data transmission. A guard interval may be inserted between the adjacent symbols so as to maintain a given interval between the symbols (e.g., which may reduce ISI).

Figure 1A:
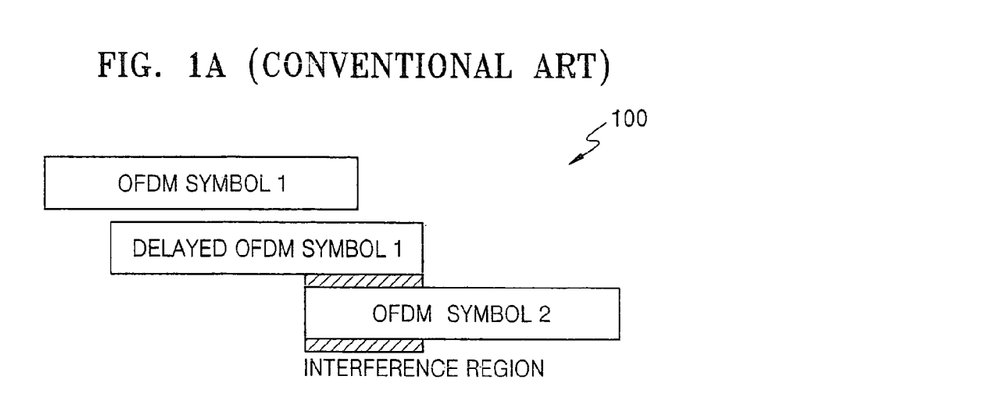
FIG. 1A illustrates an example of a conventional transmission scheme.

FIG. 1A illustrates an example of a conventional transmission scheme 100.

Figure 1B:
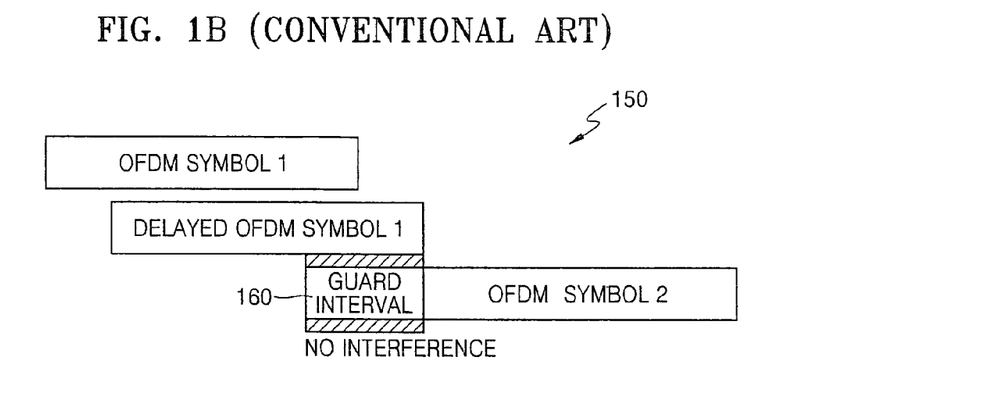
FIG. 1B illustrates an example of a conventional transmission scheme including a guard interval.

FIG. 1B illustrates an example of a conventional transmission scheme 150 including a guard interval 160.

Referring to FIG. 1B, the guard interval 160 may include a zero value guard interval or a guard interval having cyclic prefixes (e.g., formed by replicating portions of the symbols).

If an interval between the cyclic prefixes is too short, ISI may occur (e.g., due to a longer channel impulse response as compared to the cyclic prefixes). If the interval between the cyclic prefixes is increased (e.g., to reduce the ISI), the data transmission rate may be reduced.

A time domain equalizing (TEQ) unit may be used to reduce the ISI. The TEQ unit may not require an increase to the interval between the cyclic prefixes.

A reception time domain equalizing (RX_TEQ) unit may be used to reduce reception channel impulse response in a discrete multi-tone (DMT)-based ADSL modem. According to the Asymmetric Digital Subscriber Line (ADSL) standard, the OFDM symbols may be constructed so as not to interfere with each other by using the cyclic prefixes. When the ADSL modem is used to transmit data through a channel having a shorter channel impulse response than the cyclic prefixes, a receiver may thereby be stabilized (e.g., since ISI between the OFDM symbols may be reduced).

The OFDM symbol between a transmission Inverse Fast Fourier Transform (IFFT) output port and/or a reception Fast Fourier Transform (FFT) input port may be affected by the channel impulse response as well as an impulse response due to digital and/or analog filters built in the transmitter and receiver. The channel impulse response of the OFDM symbol may thereby increase. Since the channel impulse response may be longer than the cyclic prefixes, ISI may occur between the OFDM symbols. Thus, the reception performance may deteriorate. If the TEQ process is performed so as to reduce the channel impulse response of the OFDM symbols, the ISI between the OFDM symbols may be reduced, which may thereby increase the reception performance.

The TEQ process may be applied to a cable-based streaming communication modem (e.g., an ADSL modem) with a continuous transmission of data. However, the TEQ process may not be capable of employment in a wireless packet communication modem (e.g., 802.11a modem, 802.11b modem, 802.11g modem, 802.16e modem, etc.).

A conventional operation of the TEQ process in a standard ADSL modem will now be described.

An impulse response of a reception channel may be estimated using a received signal. The received signal may be known at both of a receiver and a transmitter. In the ADSL standard, a pseudo-random sequence referred to as a reverb may be used. Namely, a known signal X1 may be transmitted by using the pseudo-random sequence (e.g., from the transmitter to the receiver).

A Finite Impulse Response (FIR) filter coefficient may be calculated in order to reduce the reception channel impulse response with the TEQ algorithm. Namely, assuming that a signal received by the receiver is Y1 with respect to the known signal X1, Y1=H*X1, where H=Y1/X1 is a constant corresponding to the channel impulse response, the TEQ coefficient may be given as 1/H=X1/Y1 (i.e., the reciprocal of the constant H).

The received signal may pass through the FIR filter to which the TEQ coefficient may be set. The channel impulse response of the received data may be reduced by using the TEQ process in the receiver. The ISI between the OFDM symbols may thereby be reduced and the reception performance may be increased.

Figure 2:
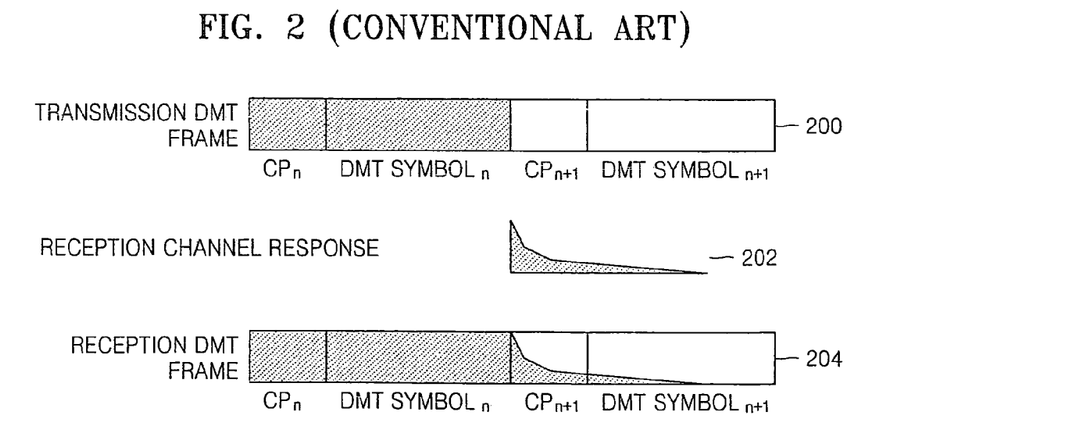
FIG. 2 illustrates a transmission scheme of an ADSL modem receiver not including a TEQ process.

FIG. 2 illustrates a transmission scheme of an ADSL modem receiver not including a TEQ process.

Referring to FIG. 2, a transmission DMT frame 200 transmitted by a transmitter may include the (n+1)-th cyclic prefix CPn+1 interposed between the n-th and (n+1)-th DMT symbols DMT SYMBOLn and DMT SYMBOLn+1. The reception channel impulse response 202 may be longer than the (n+1)-th cyclic prefix CPn+1. As shown, if the receiver does not include a TEQ process, the ISI between the n-th and (n+1)-th DMT symbols DMT SYMBOLn and DMT SYMBOLn+1 may occur in a reception DMT frame 204.

Figure 3:
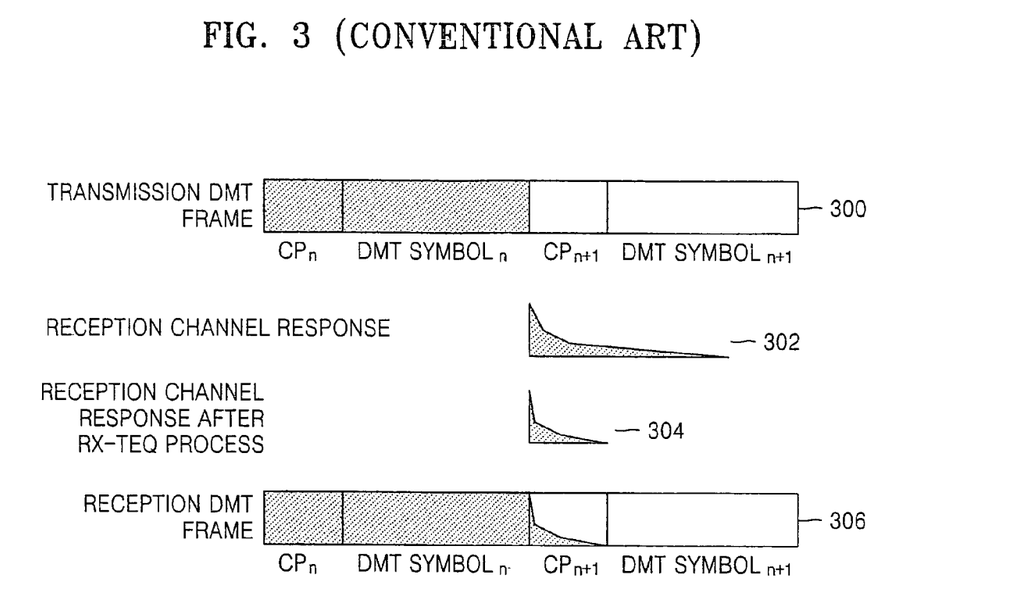
FIG. 3 illustrates a transmission scheme of an ADSL modem receiver including the TEQ process.

FIG. 3 illustrates a transmission scheme of an ADSL modem receiver including the TEQ process.

As shown in FIG. 3, when a transmission DMT frame 300 transmitted by a transmitter is passed through a reception channel, the channel impulse response 302 may increase. However, as described above, if the receiver includes a RX_TEQ process, a response signal 304 may include a reduced channel impulse response. Referring to the reception DMT frame 306, the length of the channel impulse response of the n-th DMT symbol DMT SYMBOLn may not be longer than the (n+1)-th cyclic prefix CPn+1. Thus, the ISI between DMT symbols may be reduced.

As described above, in a cable-based streaming communication modem (e.g., an ADSL modem), the TEQ coefficient may be calculated and repeatedly used until the communication is completed. However, in a wireless packet communication modem, data may be transmitted in units referred to as packets. The TEQ coefficient may require a new calculation for each transmitted packet. Conventional wireless modems may not support the TEQ process.

With respect to the ADSL standard, a given time (e.g., approximately 400 ms) may be allocated for the execution of the TEQ process. In wireless communication protocols (e.g., 802.11a), since the ISI between the OFDM symbols may be reduced by interposing the guard intervals between the OFDM symbols, the TEQ process may not be used.

In the 802.11a standard, the delay spread in an indoor environment may be smaller than the guard interval. In the 802.16 standard, the guard interval may be adjusted so as to cope with a longer delay spread (e.g., in an outdoor environment). However, in either indoor or outdoor environments, a longer delay spread may occur, which may degrade the reception performance. In addition, if the guard interval is adjusted to be longer in order to reduce the ISI between OFDM symbols, the transmission rate may be reduced by the increased guard interval.

Since the TEQ process may be applied to a reception data path of a modem, the TEQ process may be applied irrespective of the modem communication standard. For example, where the conventional TEQ process is applied to the 802.11a standard, reception channel estimation, a TEQ coefficient calculation and/or TEQ filter latency may require completion within a given interval (e.g., 8 μm). Further, the conventional TEQ coefficient calculation algorithm may require a higher amount of processing, which may require expensive hardware to implement.

SUMMARY OF INVENTION

An example embodiment of the present invention is directed to a method of communication using a wireless communication protocol, including performing a time domain process on at least one data packet scheduled for transmission using a coefficient.

Another example embodiment of the present invention is directed to a modem using a wireless communication protocol, including a reception channel estimation unit estimating a reception channel based on a received signal, a transmission channel estimation unit estimating a transmission channel based on the estimated reception channel, a coefficient calculation unit calculating a coefficient based on the estimated transmission channel and an adaptive filter receiving the calculated coefficient and performing a process on at least one data packet scheduled for transmission.

Another example embodiment of the present invention is directed to a transmitter for improving transmission performance, including a mapping unit mapping at least one data packet scheduled for transmission in a given modulation scheme, an Inverse Fast Fourier Transform (IFFT) unit transforming the at least one data packet into a digital signal, a guard interval inserting unit inserting a guard interval between at least two of the at least one data packet, an adaptive filter receiving a coefficient and performing a process on the at least one data packet, a digital-to-analog conversion (DAC) unit converting the processed data packet into an analog signal and an I/Q modulation unit modulating the analog signal with a carrier wave in a transmission band.

Another example embodiment of the present invention is directed to a receiver, including a reception channel estimation unit estimating a reception channel based on a received signal, the received signal including at least one data packet processed by a time domain process.

Another example embodiment of the present invention is directed to a method of communication using a wireless communication protocol, including receiving at least one data packet, the at least one data packet processed with a time domain process, the time domain process increasing one of the communication quality and the transmission range of the received at least one data packet.

BRIEF DESCRIPTION OF THE DRAWINGS

The example embodiments of the present invention will become more apparent by describing in detail example embodiments thereof with reference to the attached drawings in which.

DETAILED DESCRIPTION OF THE EXAMPLE EMBODIMENTS OF THE PRESENT INVENTION

Hereinafter, example embodiments of the present invention will be described in detail with reference to the accompanying drawings.

In the Figures, the same reference numerals are used to denote the same elements throughout the drawings.

In the following example embodiments, it may be assumed that wireless orthogonal frequency division multiplexing (OFDM)-based modems may include correlated reception and transmission channels. In addition, it may be assumed that the correlated reception and transmission-channels may vary during a two-packet reception and transmission time interval.

Under these assumptions, according to example embodiments of the present invention, the reception channel may be estimated using received data, time domain equalizing (TEQ) coefficient may be calculated and the TEQ coefficient may be applied to transmission data.

Figure 4:
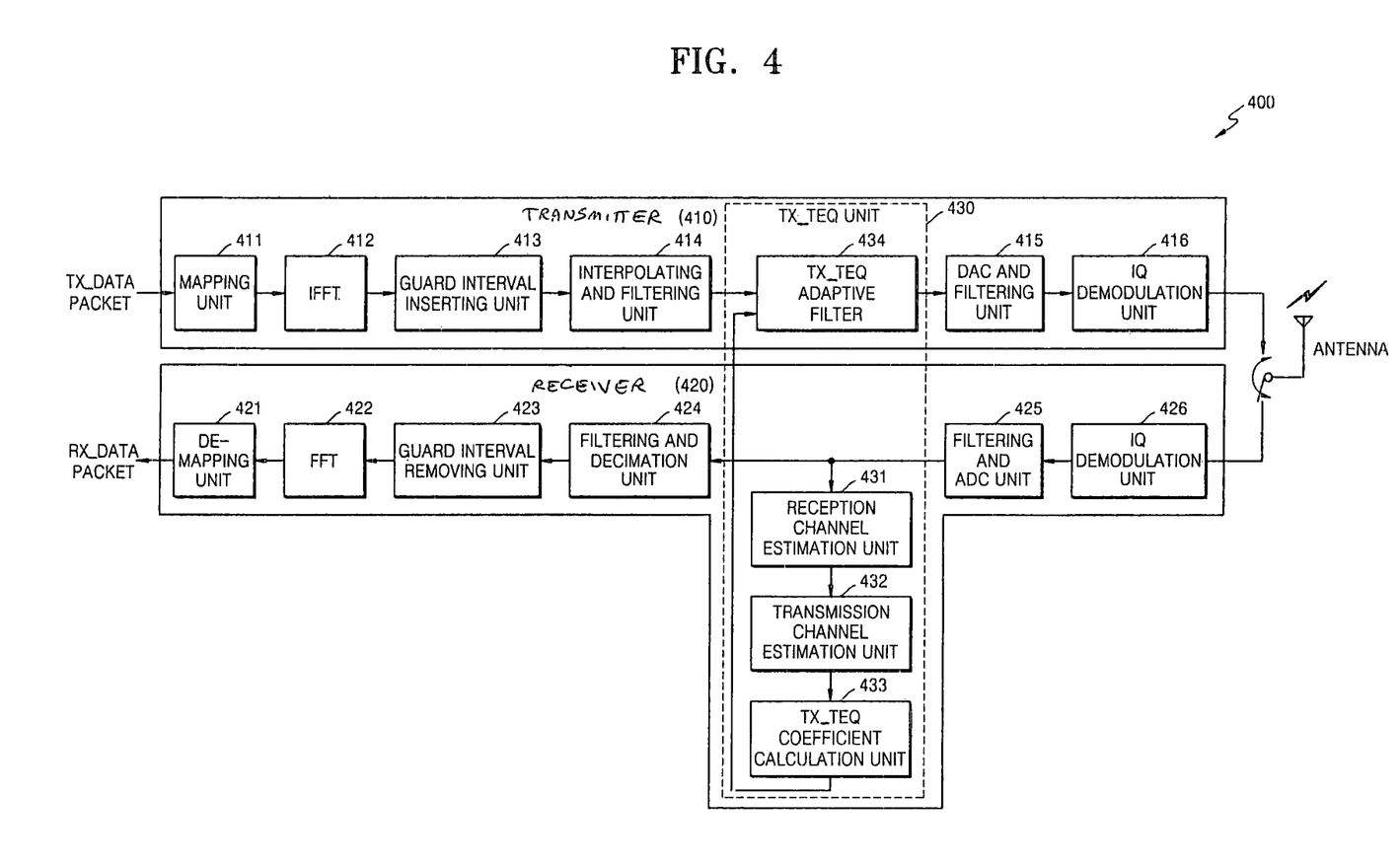
FIG. 4 is a block diagram illustrating a wireless OFDM-based modem according to an example embodiment of the present invention.

FIG. 4 is a block diagram illustrating a wireless OFDM-based modem 400 according to an example embodiment of the present invention.

In the example embodiment of FIG. 4, the wireless OFDM-based modem 400 may include a transmitter 410 for transmitting data packets, a receiver 420 for receiving data packets and a transmission time domain equalizing (TX_TEQ) unit 430 for performing a TX_TEQ process on data packets. The TX_TEQ unit 430 may be accessible to both the transmitter 410 and the receiver 420.

In the example embodiment of FIG. 4, the transmitter 410 may include a mapping unit 411, an Inverse Fast Fourier Transform (IFFT) 412, a guard interval inserting unit 413, an interpolating and filtering unit 414, a digital-to-analog conversion (DAC) and filtering unit 415, an IQ modulation unit 416 and a TX_TEQ adaptive filter 434.

In the example embodiment of FIG. 4, the receiver 420 may include a de-mapping unit 421, a Fast Fourier Transform (FFT) 422, a guard interval removing unit 423, a filtering and decimation unit 424, a filtering and analog-to-digital conversion (ADC) unit 425, an IQ demodulation unit 426, a reception channel estimation unit 431, a transmission channel estimation unit 432 and a TX_TEQ coefficient calculation unit 433.

In the example embodiment of FIG. 4, the mapping unit 411 may map the data packets scheduled for transmission at a given modulation (e.g., Quadrature Phase Shift Keying (QPSK), 16 Quadrature Amplitude Modulation (16 QAM), 64 Quadrature Amplitude Modulation (64 QAM), etc). The IFFT 412 may modulate frequency-domain data into an OFDM signal. The guard interval inserting unit 413 may insert a guard interval between the data packets in order to reduce inter-symbol interference (ISI) in a multi-path environment (e.g., where a signal may arrive from a plurality of propagations paths).

In the example embodiment of FIG. 4, the interpolating and filtering unit 414 may insert a synchronization signal in a time domain and may filter the data packets to shape the synchronization pulse.

In the example embodiment of FIG. 4, the TX_TEQ adaptive filter 434 may execute a TX_TEQ process on a data packet by using the TX_TEQ coefficient determined in the receiver 420. The TX_TEQ-applied data packet may be converted into an analog signal in the DAC and filtering unit 415. The converted analog signal may then be modulated into an IQ signal (e.g., an orthogonal modulated signal in a frequency band where the OFDM signal may be transmitted; for example, "I" may represent an in-phase component and "Q" may represent a quadrature component) in an IQ modulation unit 416.

In the example embodiment of FIG. 4, the receiver 420 may demodulate a received data packet. The received data packet may be demodulated by the IQ demodulation unit 426 and may be converted into a digital signal by the filtering and ADC unit 425. The synchronization signal and the guard interval may be removed from the digital signal by the filtering and decimation unit 424 and the guard interval removing unit 423, respectively. The digital signal may be converted into a frequency-domain signal by the FFT 422. The de-mapping unit 421 may receive and decode the data packet.

In the example embodiment of FIG. 4, the receiver 420 may calculate the TEQ coefficient while the data packet is being decoded. Namely, the digitized data packet may be received at the filtering and decimation unit 424 and the reception channel estimation unit 431.

In the example embodiment of FIG. 4, the reception channel estimation unit 431 may calculate the reception channel impulse response by using characteristics of a received data packet (e.g., the preamble and the OFDM symbols). The transmission channel estimation unit 432 may estimate the transmission channel with the calculated reception channel impulse response. The TX_TEQ coefficient calculation unit 433 may calculate the TX_TEQ coefficient by using the calculated reception channel impulse response and the estimated transmission channel. The calculated TX_TEQ coefficient may be transmitted to the transmitter 410. The TX_TEQ coefficient may be set as a coefficient of the TX_TEQ adaptive filter 434 and the TX_TEQ adaptive filter 434 may receive the data packet scheduled for transmission.

In the example embodiment of FIG. 4, the transmission channel estimation and the reception channel impulse response may be ascertained by estimating the reception channel using a signal known at the receiver and then estimating the transmission channel using the estimated reception channel. The reception channel may be estimated by applying a determination feedback to the received data other than the signal known at the receiver. In other words, the known signal may be used to estimate the reception channel of other signals.

In the example embodiment of FIG. 4, since the TEQ process may be performed on data at the transmitter 410, an additional TEQ process need not be performed. Therefore, the TEQ process need not be performed for each received data packet, the TEQ process may be used for a plurality of data packets. Thus, the TEQ process may thereby be suitable for use in modems conforming to wireless communication protocols (e.g., 802.11, 802.16, etc.). The TEQ process may reduce the reception channel impulse response (e.g., in modems with wireless communication protocols). The TEQ process may enable an implementation of the channel response to be shorter than the guard interval in a given environment (e.g., indoors, outdoors, etc.).

Figure 5:
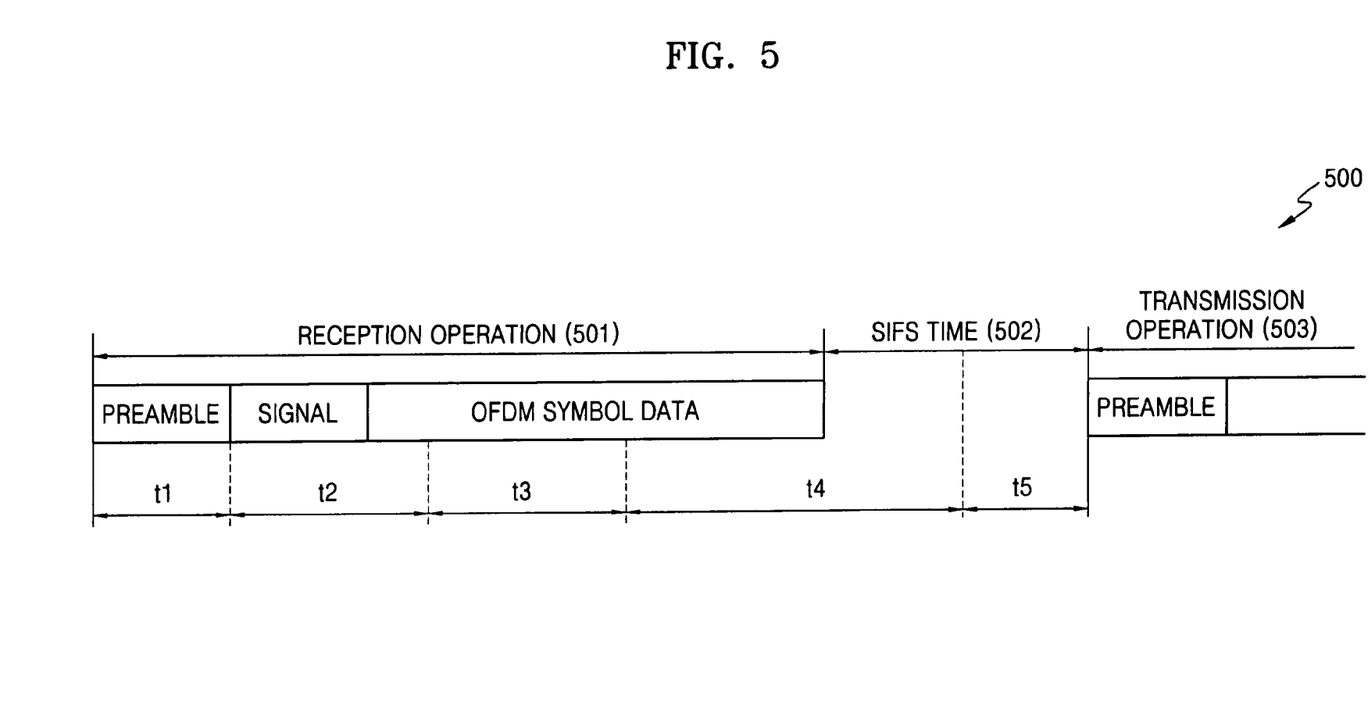
FIG. 5 illustrates a timing diagram of a TX_TEQ coefficient calculating operation using the OFDM-based modem of FIG. 4 according to another example embodiment of the present invention.

FIG. 5 illustrates a timing diagram of a TX_TEQ coefficient calculating operation 500 using the OFDM-based modem 400 of FIG. 4.

The TX_TEQ coefficient calculating operation 500 may include a data packet reception operation 501, a short inter frame space (SIFS) time 502 and a transmission operation 503.

In the data packet reception operation 501, preamble, signal and OFDM symbol data of a data packet may be received. A TX_TEQ coefficient may be calculated using the received data (e.g., the preamble, signal and OFDM symbol data of the data packet) at the TX_TEQ unit 430 (e.g., the TX_TEQ adaptive filter 434).

In the example embodiment of FIG. 5, time interval t1 may be a time interval required to estimate the reception channel and time interval t2 may be an additional time interval required to more accurately estimate the reception channel. The time interval t2 may be reduced and/or eliminated if sufficient time does not remain for time intervals t3 and/or t4.

Time interval t3 may be the time interval required to estimate the transmission channel using the estimated reception channel. Time interval t4 may be a time interval required to calculate the TX_TEQ coefficient using the estimated transmission channel. Time interval t5 may be a time interval between the time when the TX_TEQ coefficient is received at the TX_TEQ adaptive filter 434 and the beginning of the transmission operation 503.

In the reception operation 501, the TEQ process may not be directly applied. The TX_TEQ coefficient may be calculated while the received data (e.g., the preamble, signal and OFDM symbol data) may be received at the TX_TEQ adaptive filter 434 of the transmitter 410 in order to set the coefficient of the TX_TEQ adaptive filter 434. Thus, the transmitter 410 may apply the TEQ process on the data packet scheduled for transmission (e.g., during the transmission operation 503).

In the example embodiment of FIG. 5, the TX_TEQ coefficient calculating operation 500 may be applied to the OFDM-based modem 400 (e.g., complying with a 802.11a standard). Alternatively, other example embodiments of the present invention may apply the TX_TEQ coefficient calculating operation 500 to any well known wireless communication modem, system, transmitter and/or protocol.

Figure 6:
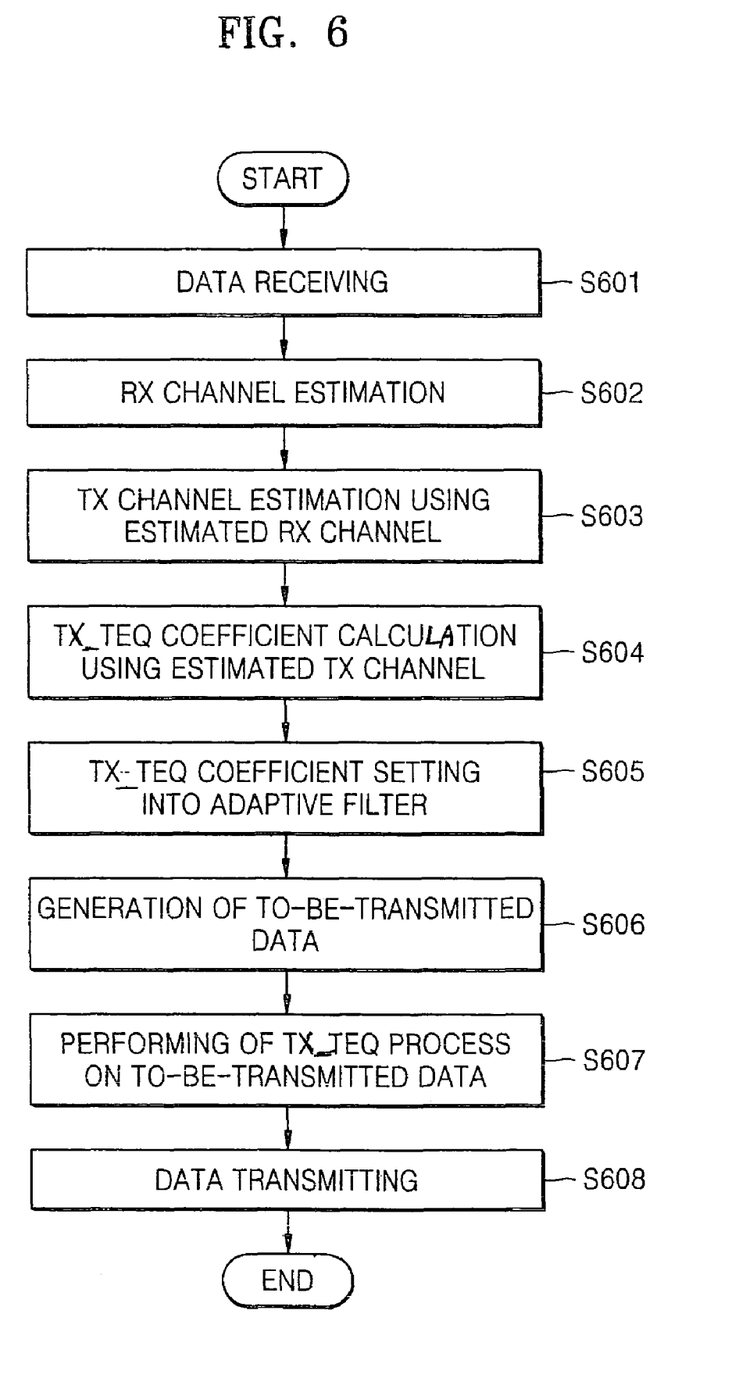
FIG. 6 is a flowchart illustrating a wireless OFDM-based data packet communication process according to another example embodiment of the present invention.

FIG. 6 is a flowchart illustrating a wireless OFDM-based data packet communication process according to another example embodiment of the present invention.

In the example embodiment of FIG. 6, a data packet may be received at a receiver (at S601). An impulse response of a reception channel may be estimated by characteristics of the received data packet (e.g., a long preamble, an OFDM symbol, etc.) (at S602). A transmission channel may be estimated using the estimated reception channel (at S603). A TX_TEQ coefficient may calculated using the estimated transmission channel (at S604).

The calculated TX_TEQ coefficient may be received at a TX_TEQ adaptive filter (e.g., TX_TEQ adaptive filter 434 of FIG. 4) of a transmission unit (e.g., transmitter 410 of FIG. 4) and an adaptive filter coefficient may be set (at S605). A data packet for transmission may be generated by the transmitter (at S606). A TX_TEQ process may be performed on the generated data packet (at S607). The TX_TEQ-processed data may be transmitted to a reception unit (e.g., receiver 420) (at S608).

In another example embodiment of the present invention, the process of FIG. 6 (at S601, S602, etc.) may be repeated for each data packet scheduled for transmission.

In another example embodiment of the present invention, a TEQ process may be adapted to any type of wireless OFDM-based data packet communication or system. A TX_TEQ filtering process suitable for a transmission channel may be performed on a transmission signal such that the transmission channel shortening effect may be determined. The ISI between the transmission OFDM symbols may thereby be reduced, which may further increase the signal-to-noise ratio (SNR).

A wireless OFDM-based modem according to another example embodiment of the present invention may increase a transmission rate for a communication device and/or lengthen an allowable transmission distance for the communication device.

The example embodiments of the present invention being thus described, it will be obvious that the same may be varied in many ways. For example, while the above described example embodiments of the present invention are directed to TX_TEQ processes, it is understood that other example embodiments of the present invention may be directed to any type of process at a transmitter, modem, and/or a receiver. Likewise, example embodiments of the present invention may use information other than and/or in addition to TX_TEQ coefficients to increase transmission and/or reception performance.

Such variations are not to be regarded as departure from the spirit and scope of the example embodiments of the present invention, and all such modifications as would be obvious to one skilled in the art are intended to be included within the scope of the following claims.

What is claimed is:

1. A method of communication using a wireless communication protocol, the method comprising:
   receiving, in a receiver, a data packet from an external source through a reception channel and demodulating the received data packet;
   estimating, in the receiver, the reception channel based on the received data packet;
   estimating, in the receiver, a transmission channel based on the estimated reception channel;
   calculating, in the receiver, a coefficient based on the estimated transmission channel; and
   performing, in a transmitter, a time-domain process on at least one data packet scheduled for transmission using the coefficient;
   wherein demodulating the received data packet and calculating the coefficient are performed in parallel, and
   wherein the calculated coefficient is provided to the transmitter before the time domain process on the at least one data packet scheduled for transmission is performed.

2. The method of claim 1, wherein the time-domain process is a transmission time domain equalizing (TX_TEQ) process, and
   wherein the coefficient is a TX_TEQ coefficient.

3. The method of claim 2, wherein performing the TX_TEQ process is performed at the transmitter.

4. The method of claim 2, wherein the transmitter performs the time-domain process on two or more data packets scheduled for transmission using the coefficient, and
   wherein the method further comprises:
   mapping the two or more data packets scheduled for transmission in a given modulation scheme;
   modulating the mapped two or more data packets scheduled for transmission into a digital signal;
   inserting a guard interval between at least two data packets of the digitized mapped two or more data packets scheduled for transmission;
   converting the digitized mapped two or more data packets scheduled for transmission into an analog signal; and
   modulating the analog signal into a carrier wave in a transmission band.

5. The method of claim 4, wherein the TX_TEQ process is performed on the digitized two or more data packets scheduled for transmission after inserting the guard interval.

6. The method of claim 4, wherein the given modulation scheme is one of Quadrature Phase Shift Keying (QPSK), 16 Quadrature Amplitude Modulation (16 QAM), and 64 Quadrature Amplitude Modulation (64 QAM).

7. The method of claim 1, wherein estimating the reception channel is performed by applying a determination feedback to the received data packet.

8. The method of claim 1, wherein estimating the reception channel and the transmission channel and calculating the coefficient occur while the data packet from the external source is being received.

9. The method of claim 8, wherein the at least one data packet scheduled for transmission is extracted from the received data packet by performing an in-phase/quadrature (I/Q) demodulation on the received data packet, converting the received data packet from an analog signal into a digital signal, removing a guard interval from the digital signal, converting the digital signal into a frequency domain, and de-mapping the digital signal.

10. The method of claim 1, wherein the wireless communication protocol is one of 802.11a, 802.11b, 802.11g, and 802.16e.

11. The method of claim 1, further comprising:
transmitting the at least one data packet scheduled for transmission.

12. The method of claim 1, wherein estimating, in the receiver, the reception channel based on the received data packet, and estimating, in the receiver, the transmission channel based on the estimated reception channel, occur sequentially.

13. A modem using a wireless communication protocol, the modem comprising:
a transmission unit transmitting at least one data packet; and
a reception unit receiving the at least one data packet and demodulating the received at least one data packet;
wherein the reception unit comprises:
a reception channel estimation unit estimating a reception channel based on the received at least one data packet;
a transmission channel estimation unit estimating a transmission channel based on the estimated reception channel; and
a coefficient calculation unit calculating a coefficient based on the estimated transmission channel;
wherein the transmission unit comprises:
an adaptive filter receiving the calculated coefficient and performing a process on at least one data packet scheduled for transmission;
wherein demodulating the received at least one data packet and calculating the coefficient are performed in parallel, and
wherein the calculated coefficient is provided to the transmission unit before the process on the at least one data packet scheduled for transmission is performed.

14. The modem of claim 13, wherein the coefficient calculation unit is a transmission time domain equalizing (TX_TEQ) coefficient calculation unit,
wherein the coefficient is a TX_TEQ coefficient,
wherein the adaptive filter is a TX_TEQ adaptive filter, and
wherein the process is a TX_TEQ process.

15. The modem of claim 13, wherein the received at least one data packet is accessible to the transmitter.

16. The modem of claim 13, wherein the reception channel estimation unit estimates the reception channel by applying a determination feedback to the received at least one data packet.

17. The modem of claim 13, wherein the wireless communication protocol is one of 802.11a, 802.11b, 802.11g, and 802.16e.

18. The modem of claim 13, wherein the adaptive filter performs the process on two or more data packets scheduled for transmission, and
wherein the transmission unit includes:
a mapping unit mapping the two or more data packets scheduled for transmission in a given modulation scheme;
an Inverse Fast Fourier Transform (IFFT) unit transforming the two or more data packets scheduled for transmission into a digital signal;
a guard interval inserting unit inserting a guard interval between at least two of the two or more data packets scheduled for transmission;
a TX_TEQ adaptive filter receiving a TX_TEQ coefficient and performing a TX_TEQ process on the two or more data packets scheduled for transmission;
a digital-to-analog conversion (DAC) unit converting the TX_TEQ-processed two or more data packets scheduled for transmission into an analog signal; and
an in-phase/quadrature (I/Q) modulation unit modulating the analog signal with a carrier wave in a transmission band.

19. The modem of claim 13, wherein the coefficient calculation unit calculates the coefficient while the at least one data packet is being received.

20. The modem of claim 13, wherein the receiver includes:
an in-phase/quadrature (I/Q) demodulation unit removing a carrier wave from the received at least one data packet and performing an I/Q demodulation on the received at least one data packet;
an analog-to-digital conversion (ADC) unit converting the received signal from an analog signal into a digital signal;
a guard interval removing unit removing a guard interval from the digital signal;
a Fast Fourier Transform (FFT) unit converting the digital signal into a frequency domain; and
a de-mapping unit de-mapping the converted digital signal.

21. The modem of claim 13, wherein the modem is included within a communication system.

22. The modem of claim 13, wherein the reception channel estimation unit estimating the reception channel based on the received at least one data packet, and the transmission channel estimation unit estimating the transmission channel based on the estimated reception channel, occur sequentially.

* * * * *